(12) United States Patent
Zhao et al.

(10) Patent No.: US 12,510,161 B2
(45) Date of Patent: Dec. 30, 2025

(54) MECHANICAL SEALING DEVICE FOR SEALING LIQUID

(71) Applicant: AIGI Environmental Inc., Nanjing (CN)

(72) Inventors: Jingwei Zhao, Nanjing (CN); Jun Zhang, Nanjing (CN)

(73) Assignee: AIGI Environmental Inc., Nanjing (CN)

( * ) Notice: Subject to any disclaimer, the term of this patent is extended or adjusted under 35 U.S.C. 154(b) by 0 days.

(21) Appl. No.: 18/582,150

(22) Filed: Feb. 20, 2024

(65) Prior Publication Data

US 2024/0191800 A1 Jun. 13, 2024

Related U.S. Application Data

(62) Division of application No. 17/679,202, filed on Feb. 24, 2022.

(30) Foreign Application Priority Data

Jul. 13, 2021 (CN) .......................... 202110788535.X

(51) Int. Cl.
| | |
|---|---|
| *F16J 15/32* | (2016.01) |
| *F16J 15/18* | (2006.01) |
| *F16J 15/3252* | (2016.01) |
| *F16J 15/3276* | (2016.01) |

(52) U.S. Cl.
CPC ......... *F16J 15/3276* (2013.01); *F16J 15/188* (2013.01); *F16J 15/3252* (2013.01)

(58) Field of Classification Search
CPC ..... F16J 15/3276; F16J 15/188; F16J 15/3252
See application file for complete search history.

(56) References Cited

U.S. PATENT DOCUMENTS

| | | | | |
|---|---|---|---|---|
| 3,540,743 | A | * | 11/1970 | Kupfert ................... F16J 15/344 |
| | | | | 277/390 |
| 3,608,910 | A | * | 9/1971 | Tyler ........................ F16J 15/38 |
| | | | | 415/174.3 |
| 3,843,140 | A | * | 10/1974 | Mayer ................... F04D 29/128 |
| | | | | 415/110 |
| 4,747,604 | A | * | 5/1988 | Nakamura ............. F16J 15/344 |
| | | | | 175/371 |
| 5,560,621 | A | * | 10/1996 | Zutz ....................... F16J 15/344 |
| | | | | 277/390 |
| 5,577,739 | A | * | 11/1996 | Ciotola ................ F16J 15/3488 |
| | | | | 277/380 |

(Continued)

*Primary Examiner* — Vishal A Patel
(74) *Attorney, Agent, or Firm* — Grogan, Tuccillo & Vanderleeden, LLP

(57) ABSTRACT

A mechanical sealing device for sealing fluid from escaping a housing through which a rotating shaft is arranged includes a rotatable ring fixed to and disposed about the rotating shaft. A stationary ring is disposed about the rotating shaft, and abuts a stationary ring at a contact point. A peripheral rim is provided and surrounds the rotatable ring and the stationary ring. The peripheral rim defines an inclined surface exposed to the fluid and includes a distal end that protrudes radially beyond the rotatable ring and the stationary ring. One of either the rotatable or stationary rings includes an inclined chamfer adjacent the contact point, the inclined chamfer defining a plane that is parallel to the inclined surface.

3 Claims, 9 Drawing Sheets

(56) References Cited

U.S. PATENT DOCUMENTS 7,347,290 B2 * 3/2008 Yu ........................ E21B 10/25
                                                                              384/94
7,635,034 B2 * 12/2009 Williams ............. E21B 33/085
                                                                              175/203

* cited by examiner

MECHANICAL SEALING DEVICE FOR SEALING LIQUID

CROSS-REFERENCE TO RELATED APPLICATION

This application is a divisional application of U.S. patent application Ser. No. 17/679,202, filed on Feb. 24, 2022, which claims priority to Chinese Application No. 202110788535.X filed on Jul. 13, 2021, each of which are hereby incorporated by reference in their entireties.

TECHNICAL FIELD

The present application relates to the field of mechanical sealing technology and in particular to a mechanical sealing device for sealing liquid which is designed with a peripheral rim.

BACKGROUND ART

Generally, rotating equipment comprises a rotating shaft and an equipment enclosure, and the rotating shaft inserting through the equipment enclosure is sealed by a mechanical sealing device for sealing liquid, such that liquid existed inside the equipment enclosure is isolated from air outside the equipment enclosure. For this, the mechanical sealing device comprises rotating and stationary rings both to be mounted around the rotating shaft, and an end surface of the rotating ring adjoins an end surface of the stationary ring by means of springs, thereby forming a sealing interface perpendicular to an axis of the rotating shaft.

It is necessary for production processes of metallurgy, electric power, petrochemical, coal mining, papermaking, etc. to use the rotating equipment (for example, a pump) with the mechanical sealing device to deliver slurry liquid containing impurities, such as hard particles and/or fibers. However, the impurities in the slurry liquid are likely to accumulate in a gap formed between the rotating ring and a rear cover of the pump, scale between the stationary ring and an O-ring sealing the stationary ring, and bump into the sealing interface, causing the rotating and/or stationary rings to be jammed and unable to perform an axial compensation movement. Moreover, the end surfaces of the rotating and stationary rings are going to be worn when the hard particles in the slurry liquid enter the sealing interface.

The above-mentioned problem in the prior art is solved by setting a peripheral surface of the rotating ring to be flush with that of the stationary ring for forming an end of the sealing interface that is in contact with the liquid, so as to avoid the impurities in the liquid to accumulate at and bump into the sealing interface. Nevertheless, for the purpose of reducing friction, one of the rotating and stationary rings is shortened in diameter for forming the other end of the sealing interface that is in contact with air. Generally, this is a reasonable design in line with the knowledge of fluid mechanics and thermodynamics. Although it is proposed in the prior art to set one of the rotating and stationary rings to be higher than the other for forming the end of the sealing interface that is in contact with the liquid, an impact of the impurities in the liquid on the sealing interface is often ignored.

In summary, there are challenges in an application of the mechanical sealing device to the rotating equipment, such as the pump used for delivering the slurry liquid. First, the rotating and stationary rings in contact with the slurry liquid are easy to be worn and hence damaged, resulting in a leakage of the pump. Then, the service life of the mechanical sealing device is shortened so much that it is necessary to stop the pump to replace the mechanical sealing device frequently, causing an economic loss. Further, a large amount of rinsing water is required to rinse the mechanical sealing device, resulting in a waste of water and hence a cost rise.

It is proposed in Chinese patent CN 209856382U to provide a sealing device with a peripheral rim for one of rotating and stationary rings adjacent to an end of a sealing interface that is in contact with liquid. The peripheral rim comprises an inclined surface extending beyond the other of the rotating and the stationary rings. When rotating equipment is operated, the peripheral rim contributes to a turbulent flow of the liquid, and impurities in the liquid are induced to move away from the sealing interface along the inclined surface due to a centrifugal force. Although the service life of the sealing device with this designed peripheral rim is prolonged, it becomes more complicated and less flexible to manufacture the rotating and/or stationary rings.

SUMMARY OF THE INVENTION

For overcoming the above-mentioned problems in the existing mechanical sealing devices, the present application provides a mechanical sealing device for sealing liquid which effectively keeps impurities in a liquid medium away from a sealing interface and can be manufactured cost effectively. That is, the mechanical sealing device can reduce a likelihood that the impurities accumulate at and bump into the sealing interface.

In one aspect of the present application, there is provided a mechanical sealing device for sealing liquid, the mechanical sealing device being configured to seal a rotating shaft inserting through an equipment enclosure so as to protect a liquid medium existed inside the equipment enclosure from leaking, the mechanical sealing device comprising: rotating and stationary rings and rotating and stationary ring adaptors mounted around the rotating shaft, the rotating ring adaptor being fastened to the rotating shaft and supporting the rotating ring, the stationary ring adaptor being fastened to the equipment enclosure and supporting the stationary ring, and an end surface of the rotating ring adjoining an end surface of the stationary ring by means of springs so as to form a sealing interface perpendicular to an axial direction, the sealing interface comprising an adjoining point that is in contact with the liquid medium in an axial section of the device; and a annular peripheral rim surrounding the rotating and stationary rings for agitating the liquid medium, at least a part of the peripheral rim being formed with an inclined surface oriented toward the adjoining point, the inclined surface comprising a start point close to the adjoining point and an end point away from the adjoining point in the axial section of the device, and the start point being spaced apart from the adjoining point while the end point extending not beyond the adjoining point in the axial direction.

Optionally, the peripheral rim is integrally formed with one of the rotating and stationary rings, such that the one of the rotating and stationary rings has a cross section extending radially beyond the other of the rotating and stationary rings and a part of one of the rotating and stationary rings adjoins the other of the rotating and stationary rings Optionally, the peripheral rim is integrally formed with the rotating ring adaptor, and wherein the peripheral rim protrudes from the rotating ring adaptor so as to be placed over an outer peripheral surface of the rotating ring, or wherein the peripheral rim protrudes from the rotating ring adaptor and is spaced apart from the rotating ring.

Optionally, the peripheral rim is integrally formed with the stationary ring adaptor and an outer peripheral surface of the peripheral rim that is away from the adjoining point is configured to abut against an inner wall surface of the equipment enclosure.

Optionally, the mechanical sealing device further comprises a cylindrical or annular additional component integrally formed with the peripheral rim, the additional component being detachably mounted on an end of the rotating ring adaptor that is opposite to the rotating ring in the axial direction, such that a generatrix of an outer peripheral surface of the rotating ring adaptor is parallel with or at an angle with the axial direction.

Optionally, the rotating ring has an outer or inner peripheral surface connected to the rotating ring adaptor by means of an O-ring and the stationary ring has an outer or inner peripheral surface connected to the stationary ring adaptor by means of another O-ring.

Optionally, the inclined surface comprises at least one of a straight surface, a curved surface, and a corrugated surface.

Optionally, the peripheral rim has an axial section configured to comprise at least one of a tapered shape, a polygonal shape, and an arc shape.

Optionally, the peripheral rim is disposed only at the outside or inside of the sealing interface.

Optionally, the rotating ring is configured as an integral or split structure and the stationary ring is configured as an integral or split structure.

Optionally, the mechanical sealing device further comprises a gland connected to the stationary ring adaptor and a shaft sleeve disposed around the rotating shaft, the shaft sleeve being integrally formed with the rotating ring adaptor or being formed as a separate component connected to the rotating ring adaptor, so as to package the rotating and stationary rings, the rotating and stationary ring adaptors and the springs together, thereby forming a packaged mechanical seal.

Described below are beneficial effects achieved by the present application:

(1) the peripheral rim is designed to agitate the liquid medium for forming a turbulent flow, resulting in changes in the temperature, flow rate and pressure of the liquid medium, thus, the impurities, especially the hard particles mixed in the liquid medium move chaotically with the liquid medium and can't be deposited, so as to prevent the impurities from accumulating at and bumping into the sealing interface (2) the peripheral rim can act as a barrier effectively blocking the impurities in the liquid medium from entering into the sealing interface or a working area of the mechanical sealing device, and the peripheral rim can also act as a pump facilitating heat dissipation of the rotating and stationary rings so as to reduce a thermal deformation;

(3) the rotating and/or stationary rings can be connected to the rotating and/or stationary ring adaptors on the inner and/or outer peripheral surfaces by means of the respective O-rings, further facilitating the heat dissipation of the rotating and stationary rings; and (4) the mechanical sealing device is significantly improved in its sealing effect and the service life thereof is prolonged.

Further features of the present disclosure and advantages thereof will become apparent from the following detailed description of exemplary embodiments according to the present disclosure with reference to the adjoining drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF PREFERRED EMBODIMENTS

Figure 1:
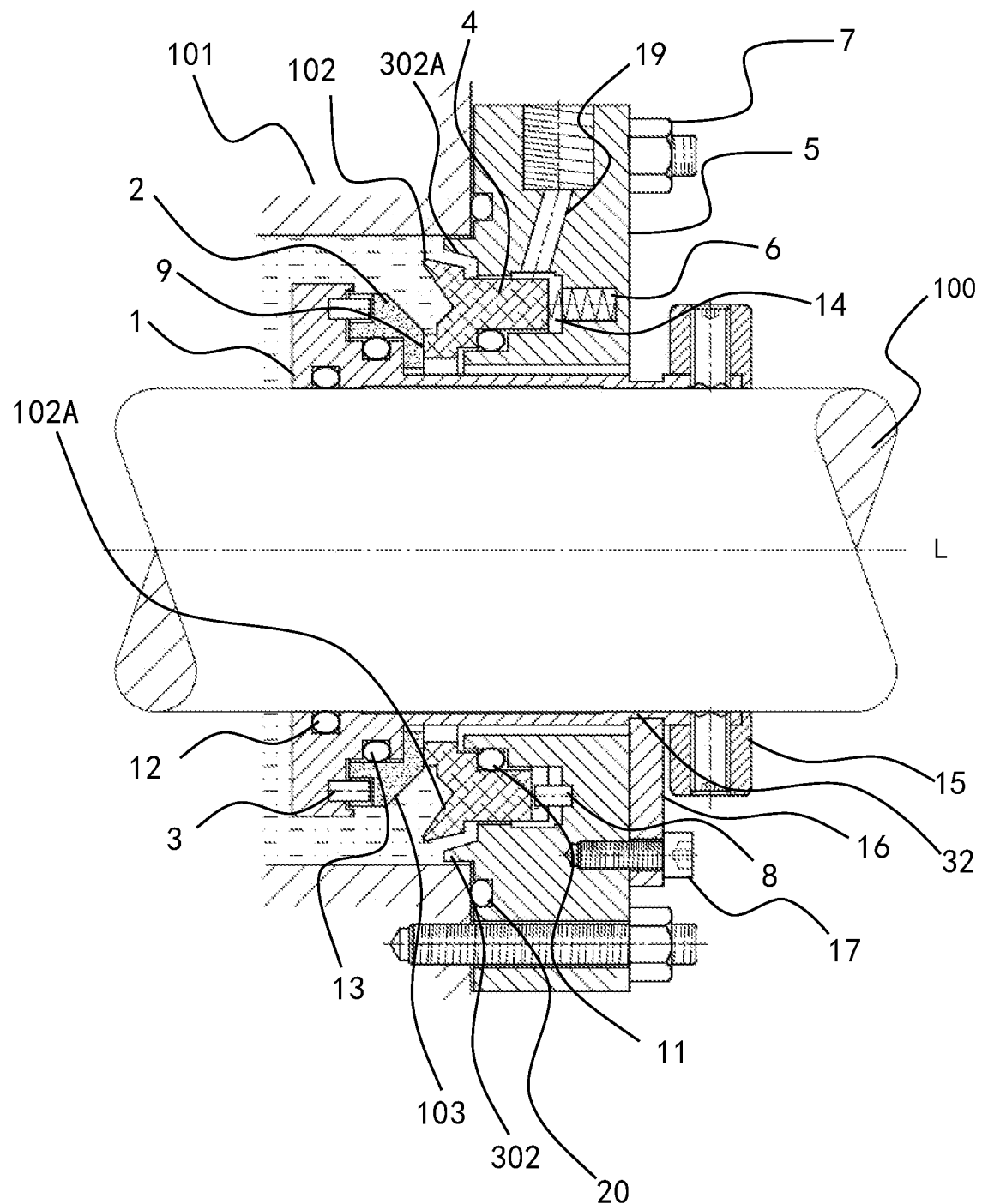
FIG. 1 is a view in axial section of a mechanical sealing device for sealing liquid mounted on rotating equipment according to an embodiment of the present application.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Hereinafter, a mechanical sealing device for sealing liquid provided by the present application is referred to as a sealing device. The exemplary sealing device is suitable for using in rotating equipment such as a pump. The rotating equipment comprises an equipment enclosure 101 and a rotating shaft 100 inserting through the equipment enclosure 101, such that the rotating shaft 100 is at least partially placed in the equipment enclosure 101. In view of this, the term "axial direction" refers to a direction along an axis L of the rotating shaft 100, the term "axial section" refers to a vertical plane containing the axis L, the term "end surface" refers to an area from a plane perpendicular to the axis L, the term "front" refers to a direction running further into the equipment enclosure 101 in the axial direction, i.e., a left hand side in each figure, the term "rear" refers to a direction running away from the equipment enclosure 101 in the axial direction, i.e., a right hand side in each figure, the term "inner" refers to a direction approaching the axis L in a radial direction, and the term "outer" refers to a direction away from the axis L in the radial direction.

Generally, each of the exemplary sealing devices shown in FIGS. 1 to 9 comprises a plurality of components assembled together, and the plurality of components cooperate with each other to seal the rotating shaft 100 with respect to the equipment enclosure 101, thereby preventing a liquid medium existed inside the equipment enclosure 101 from leaking. Moreover, the exemplary sealing devices may be configured as a packaged-type sealing device or a separated-type sealing device.

The plurality of components may comprise a rotating ring assembly fixed to and rotating with the rotating shaft 100 and a stationary ring assembly fixed to and keeping stationary with the equipment enclosure 101.

The rotating ring assembly comprises a rotating ring adaptor 1 and a rotating ring 2 supported by the rotating ring adaptor 1. The rotating ring 2 is circumferentially fixed relative to the rotating ring adaptor 1 by means of a plurality of pins 3.

The stationary ring assembly comprises a stationary ring adaptor 5 and a stationary ring 4 supported by the stationary ring adaptor 5. The stationary ring adaptor 5 is provided with a plurality of springs 6 for pushing the stationary ring 4 forward, and the stationary ring 4 is circumferentially fixed relative to the stationary ring adaptor 5 by means of a plurality of pins 8. The plurality of springs 6 pushes the stationary ring 4 forward against the rotating ring 2, such that a certain axial pressure is applied to the rotating and stationary rings 2, 4, while allowing the rotating ring 2 to rotate relative to the stationary ring 4. In the present application, the plurality of springs 6 can preferably be configured as small cylindrical springs or replaced by bellows.

The stationary ring adaptor 5 can be fastened to a rear wall surface of the equipment enclosure 101 by a plurality of bolts 7 to cover a hole of the equipment enclosure 101 through which the rotating shaft 100 passes. Thus, in the present application, the stationary ring adaptor 5 is also functioned as a gland as well known in the prior art. Additionally or alternatively, the sealing device may comprise a gland connected to the stationary ring adaptor 5, the gland being fastened to the rear wall surface of the equipment enclosure 101 by the plurality of bolts 7 to cover the hole of the equipment enclosure 101 through which the rotating shaft 100 passes.

One or both of the rotating and stationary rings 2, 4 may have an integral or split structure, that is, comprise a pair of semi-annular halves, the pair of halves being assembled to each other for forming a complete sealing ring around the rotating shaft 100. Split or joint surfaces of the pair of halves may be provided with matching structures, such as convex and concave structures, respectively, so as to facilitate maintaining a connection state of the pair of halves. Moreover, a split line of the pair of halves is perpendicular to the axial direction.

If both of the rotating and stationary rings 2, 4 are split, the split line of the pair of halves of the rotating ring 2 need to be circumferentially offset from the split line of the pair of halves of the stationary ring 4.

In the present application, for easy replacement of the rotating and stationary rings 2, 4, it is preferable that both of the rotating and stationary rings 2, 4 are split. However, it is within the scope of the present application that only one of the rotating and stationary rings 2, 4 is split, especially the one that is prone to be worn.

Material of the rotating and stationary rings 2, 4 may be any one of plastic, ceramic, for example, silicon carbide, graphite, and metal alloy, for example, tungsten carbide. Material of the rotating and stationary ring adaptors 1, 5 may be metal alloy, for example, 316 stainless steel or 304 stainless steel.

Described below are designed peripheral rims provided by the embodiments of the present application. It is noted that the embodiments can be combined or used separately according to a specific application.

Figure 2:
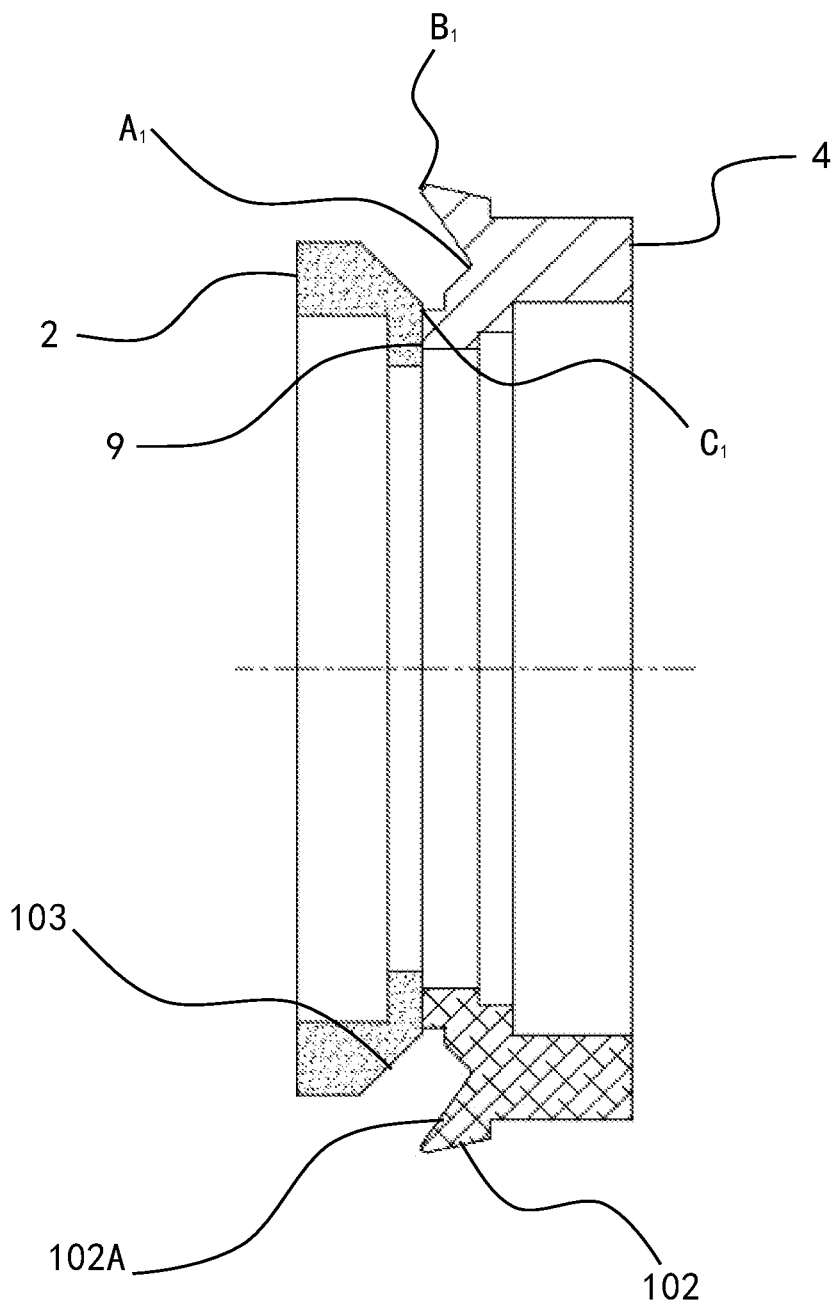
FIG. 2 is a detailed view in axial section of stationary and rotating rings of the mechanical sealing device in FIG. 1.

In the embodiment as seen in FIG. 1 and detailed in FIG. 2, a peripheral rim 102 is integrally formed with the stationary ring 4 and disposed adjacent to the sealing interface 9. Specifically, the stationary ring adaptor 5 may be provided with a plurality of axial holes into which the plurality of springs 6 can be placed and an annular groove 14 in communication with the plurality of axial holes, and a rear end of the stationary ring 4 is received in the annular groove 14 so as to be pushed forward by the plurality of springs 6. Thus, an end surface formed by a front end of the stationary ring 4 adjoins an end surface of the rotating ring 2 so as to form a sealing interface 9 that is perpendicular to the axial direction. The sealing interface 9 comprises an adjoining point $C_1$ in contact with the liquid medium in an axial section of the device. Moreover, the rear end of the stationary ring 4 has an inner peripheral surface connected to the stationary ring adaptor 5 via an O-ring 11.

Starting from the front end of the stationary ring 4, the peripheral rim 102 extends radially away from the sealing interface 9 as it axially approaches the sealing interface 9 so as to surround the rotating and stationary rings 2, 4. Thus, the stationary ring 4 integrally formed with the peripheral rim 102 has a cross section extending radially beyond the rotating ring 2 and the rotating ring adaptor 1, and in which case a part of one of the rotating and stationary rings 2, 4 adjoins the other of the rotating and stationary rings 2, 4.

As shown in FIGS. 1 and 2, the peripheral rim 102 has an axial section configured to comprise a tapered shape, but it can be understood that the peripheral rim 102 can have an axial section configured to comprise at least one of a tapered shape, a polygonal shape (for example, a triangle shape, a rectangle shape, a pentagonal shape, etc.), an arc shape, and the like, such that compared to the rotating ring 2 and the rotating ring adaptor 1, the peripheral rim 102 protrudes radially further into the liquid medium. Thus, the peripheral rim 102 can act to agitate the liquid medium flowing in the vicinity of the sealing interface 9 for forming a turbulent flow, thereby causing changes in the temperature, flow rate and pressure of the liquid medium. As such, impurities, especially hard particles in the liquid medium can't be deposited when the liquid medium moves chaotically.

At least a part of the peripheral rim 102 is formed with an inclined surface 102A oriented toward the adjoining point $C_1$, and the impurities in the agitated a liquid medium are discharged along the inclined surface 102A so as to move away from the sealing interface 9 due to a centrifugal force. The centrifugal force is generated by a rotation of the rotating shaft 100.

For example, as show in FIG. 2, the inclined surface 102A comprises a start point $A_1$ close to an adjoining point $C_1$ and an end point $B_1$ away from the adjoining point $C_1$ in the axial section of the device. The start point $A_1$ is spaced apart from the adjoining point $C_1$. The end point $B_1$ does not extend axially beyond the adjoining point $C_1$. The end point $B_1$ is the highest point of an axial section protruding into the liquid medium. A line connecting the start point $A_1$ to the end point $B_1$ is inclined toward the adjoining point $C_1$. Another line connecting the start point $A_1$ to the adjoining point $C_1$ is bent.

The inclined surface 102A may be configured to comprise at least one of a straight surface, a curved surface, a corrugated surface, and the like.

Additionally or alternatively, a plurality of protrusions are densely distributed on the inclined surface 102A so as to increase a frictional force between the impurities and the inclined surface 102A, such that the impurities are more likely to adhere to the inclined surface 102A by means of the frictional force and to be discharged quickly along the inclined surface 102A.

It is necessary for both of the end surfaces of the rotating and stationary rings 2, 4 to meet a relatively high roughness requirement, so as to achieve a "mirror finish" for reducing a frictional force between the rotating and stationary rings 2, 4 when the rotating ring 2 is rotating. Thus, it is in the process of machining to grind the end surfaces of the rotating and stationary rings 2, 4 separately. In FIG. 1, the peripheral rim 102 integrally formed with the stationary ring 4 does not extend axially beyond the sealing interface 9, such that a tool used to grind the end surface of the stationary ring 4 will not be affected by the peripheral rim 102 integrally formed with the stationary ring 4.

It can be seen in FIG. 1 that the rotating ring adaptor 1 comprises a front portion with a first outer diameter and a rear portion with a second outer diameter. The first outer diameter is larger than the second outer diameter. The exemplary sealing device further comprises a shaft sleeve 32 with a third outer diameter. The second outer diameter is larger than the third outer diameter. The shaft sleeve 32 extends rearward, and the shaft sleeve 32 is integrally formed with the rotating ring adaptor 1 or connected to the rotating ring adaptor 1 as a separate component, so as to package the rotating and stationary ring adaptors 1, 5, the rotating and stationary rings 2, 4, and the spring 6 together, thereby forming a packaged mechanical seal.

The front portion of the rotating ring adaptor 1 has an inner peripheral surface connected to the rotating shaft 100 via an O-ring 12.

The rotating ring adaptor 1 forms a stepped surface for placing the rotating ring 2 as a result of a difference between the first and second outer diameters and a difference between the second and third outer diameters. Correspondingly, the rotating ring 2 is shaped to be complementary to the stepped surface. That is, the rotating ring 2 comprises a front portion with a first inner diameter and a rear portion with a second inner diameter. The first inner diameter is larger than the second inner diameter. The front portion of the rotating ring 2 has an inner peripheral surface connected to the rear portion of the rotating ring adaptor 1 by means of another O-ring 13. The O-rings 12 and 13 facilitate heat dissipation of the rotating ring 2.

In the packaged mechanical seal, the rotating ring assembly is fitted with the stationary ring assembly in advance. Thus, the shaft sleeve 32 extends through the stationary ring adaptor 5 for reaching the outside of the equipment enclosure 101 and forms a clearance fit with an inner peripheral surface of the stationary ring adaptor 5 so as not to block the rotating ring assembly from rotating with the rotating shaft 100.

A locking ring 15 is mounted around the shaft sleeve 32 at the outside of the equipment enclosure 101 so as to cooperate with a plurality of positioning blocks 16 (usually three) to position the rotating ring assembly relative to the stationary ring assembly in the axial and radial directions. The plurality of positioning blocks 16 are fastened to a rear end surface of the stationary ring adaptor 5 by means of a plurality of bolts 17. Then, the rotating shaft 100 is inserted through the packaged rotating and stationary ring assemblies, and one or more screws (not shown) can be screwed into the locking ring 15 in the radial direction and pass through the shaft sleeve 32, thereby fastening the packaged rotating and stationary ring assemblies to the rotating shaft 100. Before the rotating shaft 100 starts to be operated, the plurality of positioning blocks 16 shall be removed from the rear end surface of the stationary ring adaptor 5.

Optionally, a part of the rotating ring 2 close to the sealing interface 9 forms an inclined chamfer 103 that is inclined away from the sealing interface 9, that is, the inclined chamfer 103 is inclined upward and forward and has a degree of inclination approximately equal to a degree of inclination of the line connecting the start point $A_1$ to the end point $B_1$, thereby forming a uniform oblique space that is favorable for the impurities to leave the sealing interface 9. As such, outer peripheral surfaces of the rotating and stationary rings 2, 4 are set to be substantially flush with each other. Nevertheless, the stationary ring 4 is shortened in diameter for forming an end of the sealing interface that is in contact with air, such that the sealing interface 9 has a reduced area to reduce the frictional force between the rotating ring 2 and the stationary ring 4 when the rotating ring 2 is rotating.

The stationary ring adaptor 5 may also be provided with a rinse passage 19. Since there is a gap between the outer peripheral surface of the stationary ring 4 and an outer peripheral surface of the annular groove 14, one end of the rinse passage 19 can be fluidly connected to the inside of the equipment enclosure via the gap. When necessary, rinse water free of the impurities can be fed into the other end of the rinse passage 19 for rinsing the sealing device. If the rotating equipment is operated, the rinse water shall have a pressure greater than the liquid medium existed inside the equipment enclosure.

Figure 3:
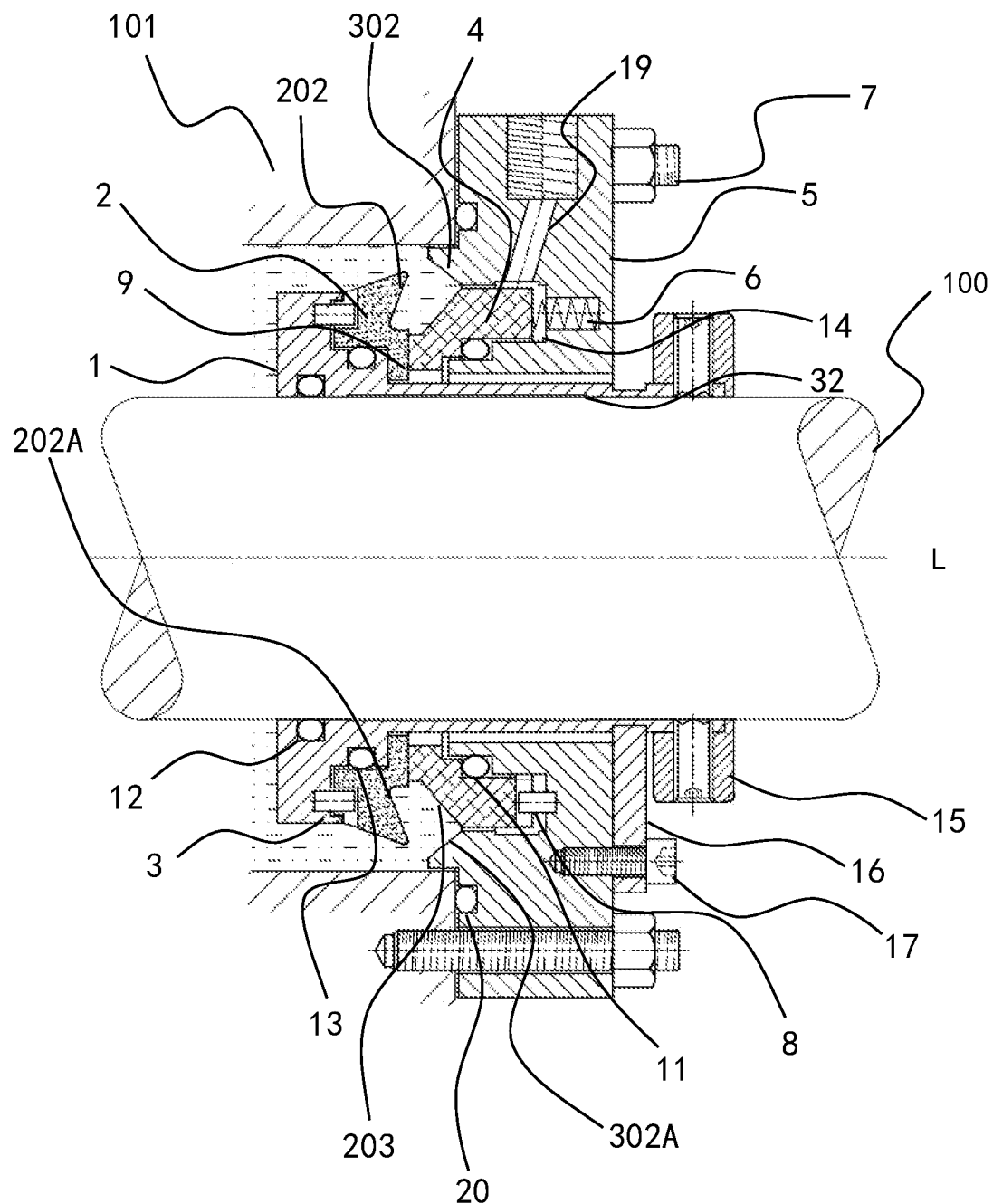
FIG. 3 is a view in axial section of a mechanical sealing device for sealing liquid mounted on rotating equipment according to another embodiment of the present application.
Figure 4:
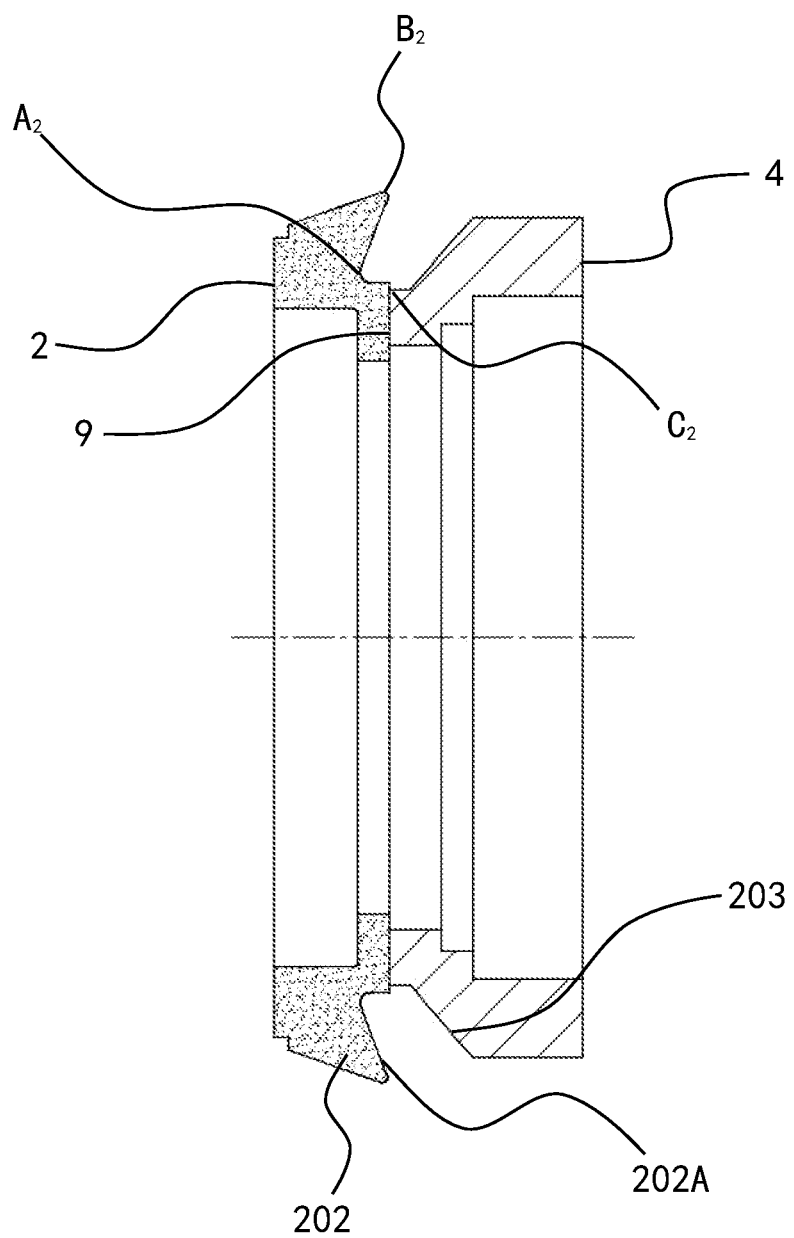
FIG. 4 is a detailed view in axial section of stationary and rotating rings of the mechanical sealing device in FIG. 3.

The embodiment as seen in FIG. 3 and detailed in FIG. 4 is different from the embodiment as seen in FIG. 1 and detailed in FIG. 2 in that a peripheral rim 202 is integrally formed with the rotating ring 2. The peripheral rim 202 extends radially away from the sealing interface 9 as it approaches the sealing interface 9. The rotating ring 2 integrally formed with the peripheral rim 202 has an axial section extending radially beyond the stationary ring 4, and in which case a part of one of the rotating and stationary rings 2, 4 adjoins the other of the rotating and stationary rings 2, 4.

In FIG. 4, a start point $A_2$ of an inclined surface 202A is spaced apart from an adjoining point $C_2$ while an end point $B_2$ does not extend axially beyond the adjoining point $C_2$. The end point $B_2$ is the highest point of an axial section protruding into the liquid medium. A line connecting the start point $A_2$ to the end point $B_2$ is inclined toward the adjoining point $C_2$. Another line connecting the start point $A_2$ to the adjoining point $C_2$ is configured as an arc line. Thus, a tool can be used to grind the end surface of the rotating ring 2 in the machining process without taking the peripheral rim 202 integrally formed with the rotating ring 2 into consideration.

In the case where the peripheral rim 202 is integrally formed with the rotating ring 2, a part of the stationary ring 4 that is adjacent to the sealing interface 9 forms an inclined chamfer 203 that is inclined away from the sealing interface 9, that is, the inclined chamfer 203 is inclined upward and rearward and has a degree of inclination approximately equal to a degree of inclination of the inclined surface 202A, thereby forming a uniform oblique space that is favorable for the impurities to leave the sealing interface 9.

A peripheral rim can be integrally formed with the stationary ring adaptor 5 instead of or in addition to the peripheral rim integrally formed with the rotating or stationary ring 2, 4. Specifically, as shown in FIG. 1, starting from a front end surface of the stationary ring adaptor 5, the peripheral rim 302 extends radially away from the sealing interface 9 as it axially approaches the sealing interface 9. At least a part of the peripheral rim 302 that is adjacent to the sealing interface 9 is formed with an inclined surface 302A oriented toward the sealing interface 9, while an outer peripheral surface of the peripheral rim 302 that is away from the sealing interface 9 is abutted against an inner wall surface perpendicular to the rear wall surface of the equipment enclosure 101. The peripheral rim 302 of the stationary ring adaptor 5 can further agitate the impurities in the flowing liquid medium and facilitate correct positioning of the stationary ring adaptor 5 relative to the equipment enclosure 101 when the stationary ring adaptor 5 is mounted to the equipment enclosure 101.

Figure 5:
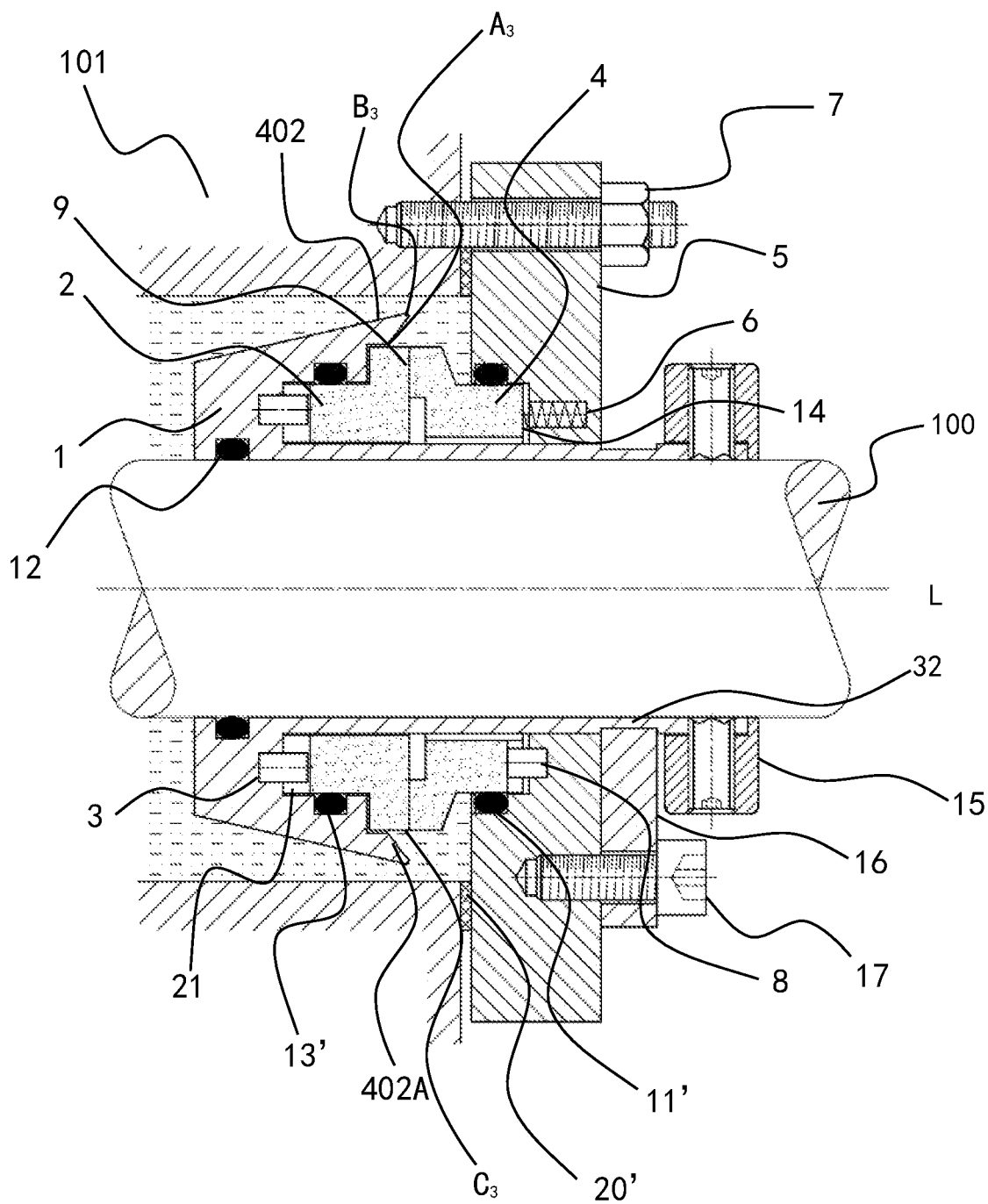
FIG. 5 is a view in axial section of a mechanical sealing device for sealing liquid mounted on rotating equipment according to another embodiment of the present application.

In the embodiment as shown in FIG. 5, a peripheral rim 402 is integrally formed with the rotating ring adaptor 1 and is disposed adjacent to the sealing interface 9. Both of the rotating ring adaptor 1 and the rotating ring 2 have a different shaped axial section in the embodiment as shown in FIG. 5 as compared to the embodiments as shown in FIGS. 1 to 4. That is, the rotating ring adaptor 1 integrally formed with peripheral rim 402 has front and rear portions with a diameter incrementally increasing from front to rear so as to form a truncated cone. The rear portion of the rotating ring adaptor 1 is provided with an annular groove 21 for receiving a front portion of the rotating ring 2. Correspondingly, a rear portion of the rotating ring 2 has an outer diameter larger than the front portion of the rotating ring 2, such that the rotating ring 2 is complementary to the rotating ring adaptor 1. The front portion of the rotating ring 2 has an outer peripheral surface connected with the rotating ring adaptor 1 by means of an O-ring 13'.

Starting from the outer peripheral surface of the rotating ring adaptor 1, the peripheral rim 402 extends radially away from the sealing interface 9 as it axially approaches the sealing interface 9, such that at least a part of the peripheral rim 402 is placed over the rear portion of the rotating ring 2, thereby forming an inclined surface 402A oriented toward the sealing interface 9. A start point $A_3$ of the inclined surface 402A is spaced apart from an adjoining point $C_3$ while an end point $B_3$ does not extend axially beyond the adjoining point $C_3$. The end point $B_3$ is the highest point of an axial section protruding into the liquid medium. An outer peripheral surface of the peripheral rim 402 that is facing away from the sealing interface 9 forms a surface inclined rearward and upward along the entire rotating ring adaptor 1. The peripheral rim 402 of the rotating ring adaptor 1 does not extend axially beyond the sealing interface 9, such that the sealing device can be configured as a compact structure especially in the axial direction.

Figure 6:
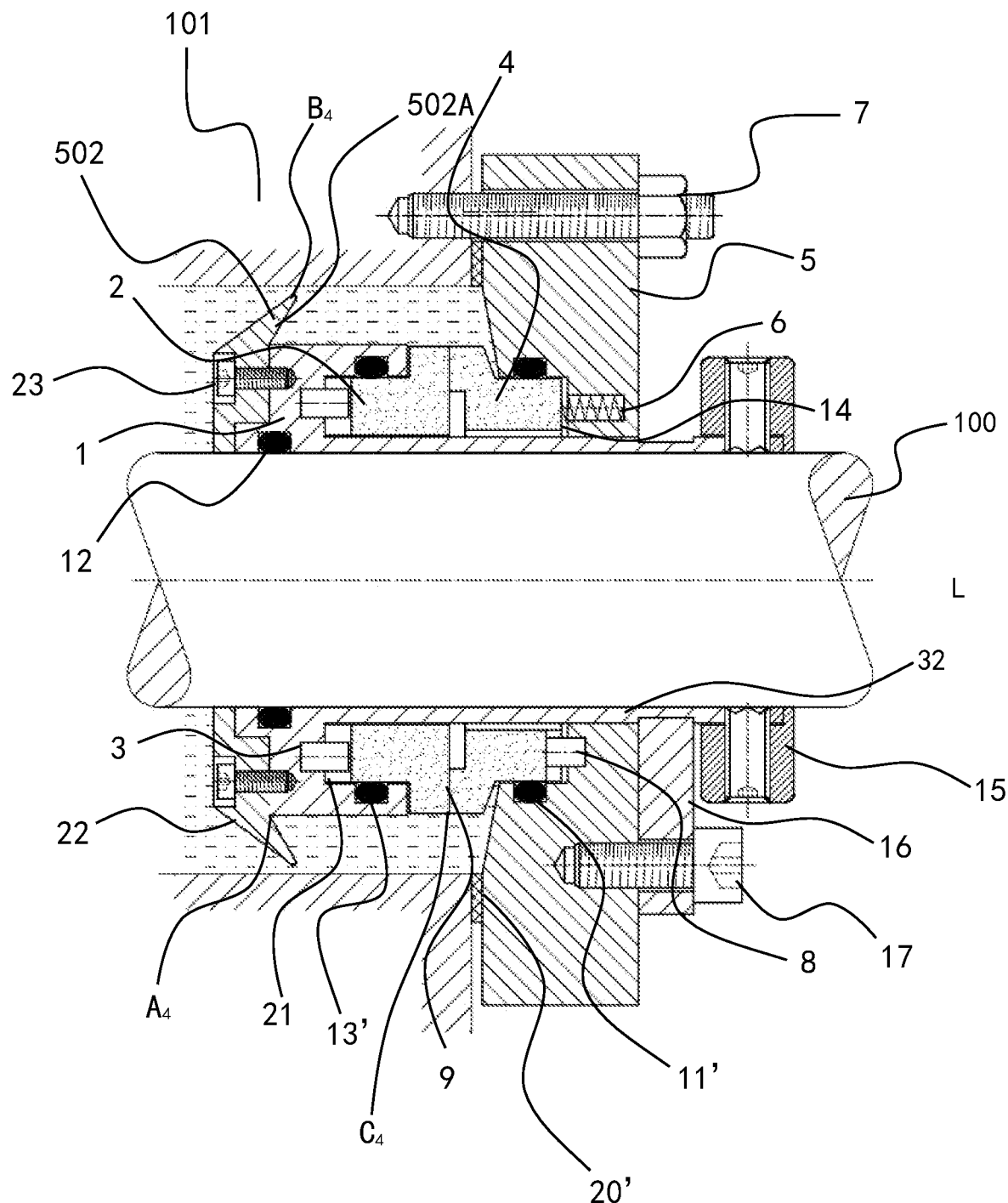
FIG. 6 is a view in axial section of a mechanical sealing device for sealing liquid mounted on rotating equipment according to another embodiment of the present application.

Different from the embodiment of FIG. 5, there is provided in the embodiment of FIG. 6 a cylindrical or annular additional component 22 detachably mounted on an end of the rotating ring adaptor 1 that is axially opposite to the other end of the rotating ring adaptor 1 for supporting the rotating ring 2. For example, a plurality of fastening screws 23 are screwed through the additional component 22 and into the front portion of the rotating ring adaptor 1 in the axial direction, thereby fastening the additional component 22 to the front portion of the rotating ring adaptor 1. Optionally, the front portion of the rotating ring adaptor 1 is provided with an additional stepped part, such that the additional component 22 can be placed over the additional stepped part of the rotating ring adaptor 1. The additional component 22 is configured as a customized component for being integrally formed with a peripheral rim 502 and to be replaced easily. As such, an original structure of the rotating ring adaptor 1 is less likely to be modified excessively with the presence of the additional component 22. In FIG. 6, the peripheral rim 502 is spaced apart from the rotating ring 2. Obviously, a start point $A_4$ of an inclined surface 502A is spaced apart from an adjoining point $C_4$ while an end point $B_4$ of the inclined surface 502A does not extend axially beyond the adjoining point $C_4$. The end point $B_4$ is the highest point of the axial section protruding into the liquid medium. In this case, the generatrix of the outer peripheral surface of the rotating ring adaptor 1 is parallel to or at an angle with the axial direction.

Figure 7:
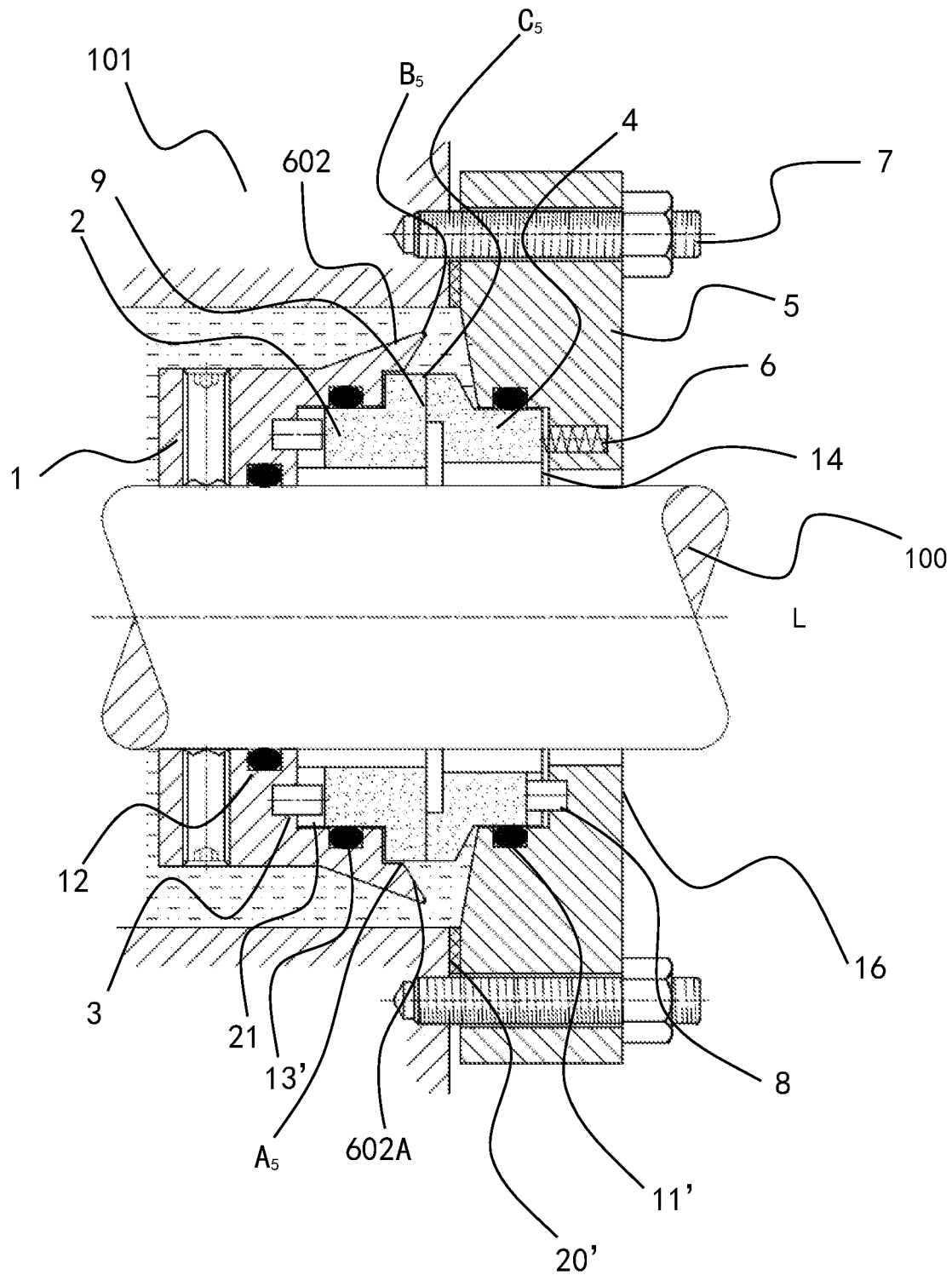
FIG. 7 is a view in axial section of a mechanical sealing device for sealing liquid mounted on rotating equipment according to another embodiment of the present application.
Figure 8:
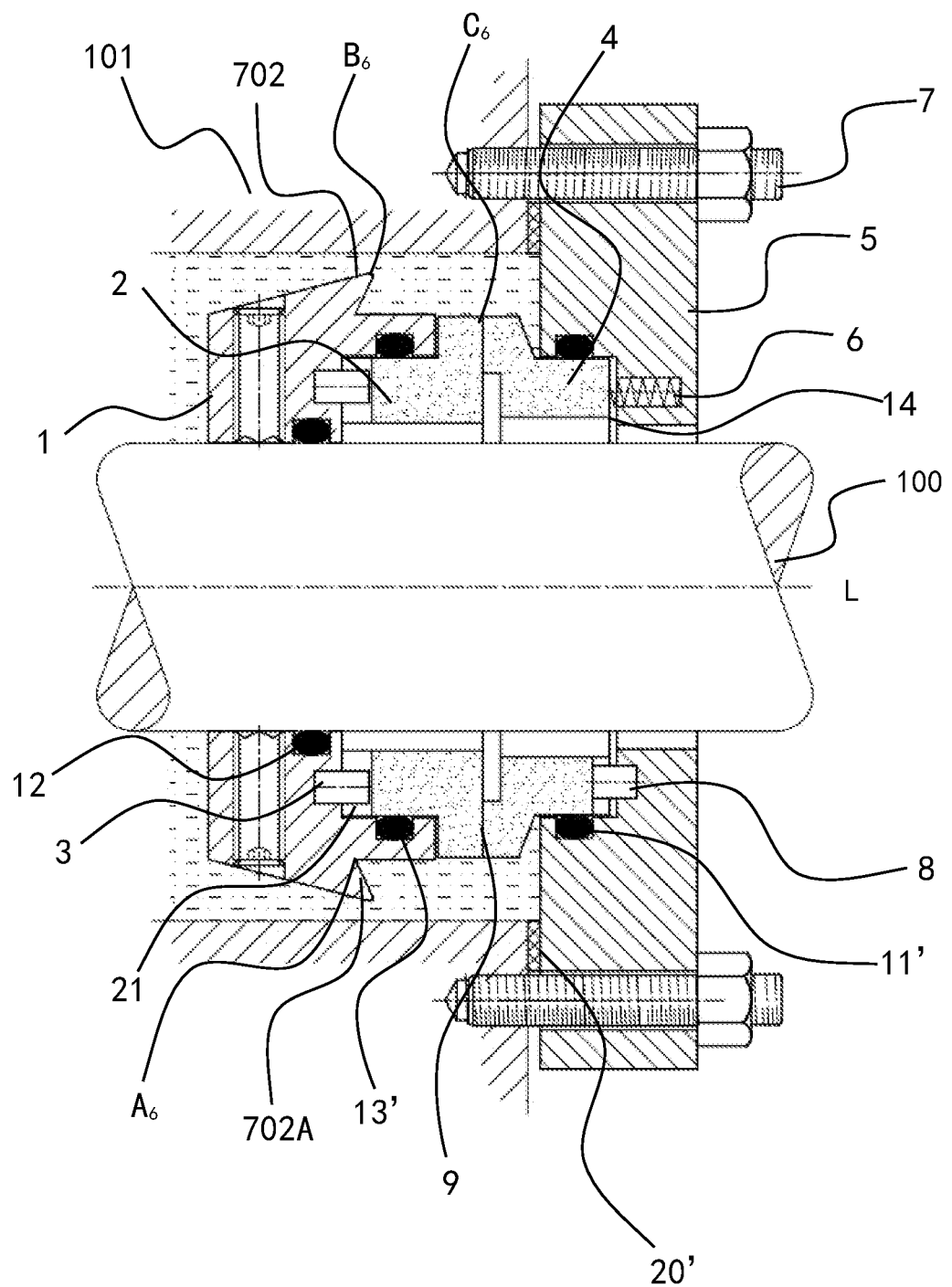
FIG. 8 is a view in axial section of a mechanical sealing device for sealing liquid mounted on rotating equipment according to another embodiment of the present application.

In the two embodiments of FIGS. 7 and 8 in which peripheral rims 602 and 702 are integrally formed with the rotating ring adaptor 1, there are provided a plurality of fastening screws, instead of the locking ring 15, configured to fasten the rotating ring adaptor 1 to the rotating shaft 100. The plurality of fastening screws are screwed through the front portion of the rotating ring adaptor 1 and into the rotating shaft 100 in the radial direction so as to fasten the rotating ring adaptor 1 to the rotating shaft 100. That is, the exemplary sealing devices of FIGS. 7 and 8 are configured as a separated-type sealing device, in which cases the peripheral rims 602 and 702 can also be designed. As shown in FIG. 7, the peripheral rim 602 is designed to protrude from the rotating ring adaptor 1 so as to be placed over the outer peripheral surface of the rotating ring 2, such that a start point $A_5$ of an inclined surface 502A is spaced apart from an adjoining point $C_5$ while an end point $B_5$ of the inclined surface 502A does not extend axially beyond the adjoining point $C_5$. As shown in FIG. 8, the peripheral rim 702 is designed to protrude from the rotating ring adaptor 1 so as to be spaced apart from the rotating ring 2, such that a start point $A_6$ of an inclined surface 702A is spaced apart from an adjoining point $C_6$ while an end point $B_6$ does not extend axially beyond the adjoining point $C_6$. Thus, the peripheral rims can be designed flexibly according to a specific application.

The peripheral rim integrally formed with the rotating ring 2 and/or the rotating ring adaptor 1 also serves as a barrier to at least partially block the impurities in the flowing liquid medium from approaching the sealing interface 9.

In each of the embodiments of FIGS. 1 to 4, the inner peripheral surface of the rear end of the stationary ring 4 is connected to the stationary ring adaptor 5 by means of an O-ring 11, and another O-ring 20 is provided between the front end surface of the stationary ring adaptor 5 and the rear wall surface of the equipment enclosure 101. By contrast, in each of the embodiments of FIGS. 5 to 8, the outer peripheral surface of the rear end of the stationary ring 4 is connected to the stationary ring adaptor 5 by means of an O-ring 11', and a gasket 20' is provided between the front end surface of the stationary ring adaptor 5 and the rear wall surface of the equipment enclosure 101. These are only examples of the components other than the peripheral rim of the sealing device in related to various configurations of the sealing device.

Figure 9:
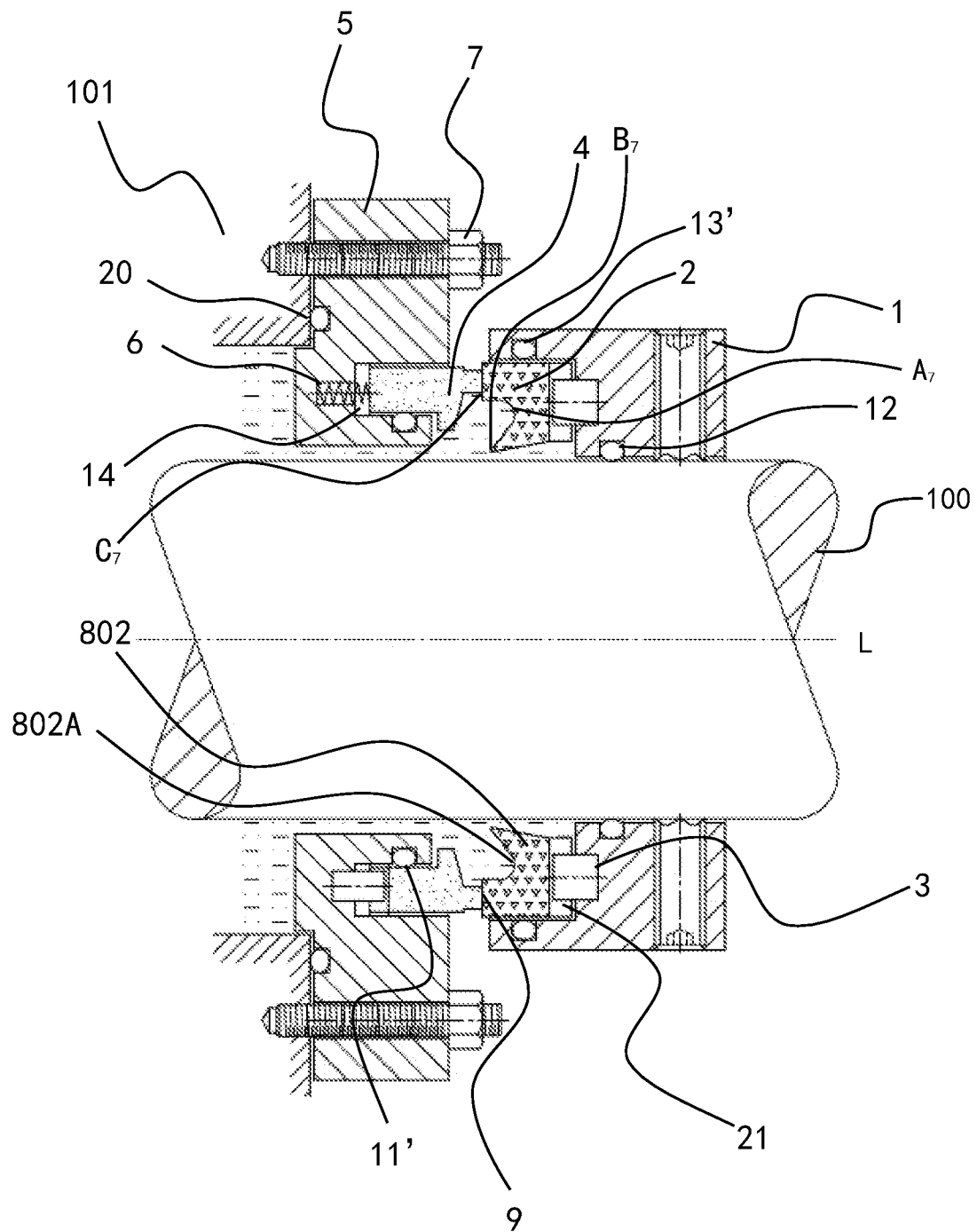
FIG. 9 is a view in axial section of a mechanical sealing device for sealing liquid mounted on rotating equipment according to another embodiment of the present application.

In each of the embodiments of FIGS. 1 to 8, an area in the equipment enclosure 101 configured for storing the liquid medium is at least partially bounded by the outer peripheral surfaces of the rotating and stationary rings 2, 4 and the front portion of the rotating ring adaptor 1, while in the embodiment of FIG. 9, the rotating ring assembly becomes located outside the equipment enclosure 101, such that an area in the equipment enclosure 101 configured for storing the liquid medium is at least partially bounded by inner peripheral surfaces of the rotating and stationary rings 2, 4 and the stationary ring adaptor 5, in which case the peripheral rim 802 is integrally formed with one of the rotating and stationary rings 2, 4.

In the embodiments of FIGS. 1 to 8, the peripheral rims 102, 202, 302, 402, 502, 602, and 702 are disposed only at the outside of the sealing interface 9, that is, the peripheral rims 102, 202, 302, 402, 502, 602, and 702 protrude radially away from the rotating shaft 100. In the embodiment of FIG. 9, the peripheral rim 802 is disposed only at the inside of the sealing interface 9, that is, the peripheral rim 802 protrudes radially inward relative to the rotating shaft 100. At least a part of the peripheral rim 802 is formed with an inclined surface 802A oriented toward an adjoining point $C_7$. The inclined surface 802A comprises a start point $A_7$ close to the adjoining point $C_7$ and an end point $B_7$ away from the adjoining point $C_7$ in an axial section of the device. The start point $A_7$ is spaced apart from the adjoining point $C_7$ while the end point $B_7$ does not extend axially beyond the adjoining point $C_7$. The end point $B_7$ is the highest point of an axial section protruding into the liquid medium.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments could be modified without departing from the scope and spirit of the present disclosure. The scope of the present disclosure is defined by the appended claims.

What is claimed is:

1. A mechanical sealing device for sealing liquid, the mechanical sealing device sealing a rotating shaft inserted through an equipment enclosure so as to protect a liquid medium existed inside the equipment enclosure from leaking, the mechanical sealing device comprising:

rotating and stationary rings and rotating and stationary ring adaptors mounted around the rotating shaft, the rotating ring adaptor being fastened to the rotating shaft and supporting the rotating ring for selective rotation with the rotating shaft, the stationary ring adaptor being fastened to the equipment enclosure and supporting the stationary ring, and an end surface of the rotating ring adjoining an end surface of the stationary ring by means of springs so as to form a contact plane, the contact plane being perpendicular to an axial direction and defining an adjoining point of the rotating and stationary rings that is in contact with the liquid medium;

an annular peripheral rim defined on one of the rotating and stationary rings for agitating the liquid medium;

an inclined surface extending between the annular peripheral rim and the adjoining point;

a rinse passage provided in the stationary ring adaptor, the rinse passage configured to be in fluid communication with the equipment enclosure;

wherein the annular peripheral rim protrudes radially beyond any other portion of the rotating and stationary rings;

wherein the other of said rotating and stationary rings includes an inclined chamfer adjacent said adjoining point, said inclined chamfer being parallel to said inclined surface;

wherein the adjoining point is positioned on an outer diameter of the contact plane; and wherein the inclined surface defines a plane oriented at an acute angle to the axis of rotation.

2. The mechanical sealing device of claim 1, wherein one or both of the rotating ring and the stationary ring are a split structure.

3. The mechanical sealing device of claim 1, further comprising a locking ring at an outside of the equipment enclosure, the locking ring configured to position the rotating ring relative to the stationary ring in the axial and radial directions.

* * * * *